P. M. PEACOCK.
FLEXIBLE PIPE CONNECTION.
APPLICATION FILED JUNE 8, 1912.
1,105,689.
Patented Aug. 4, 1914.
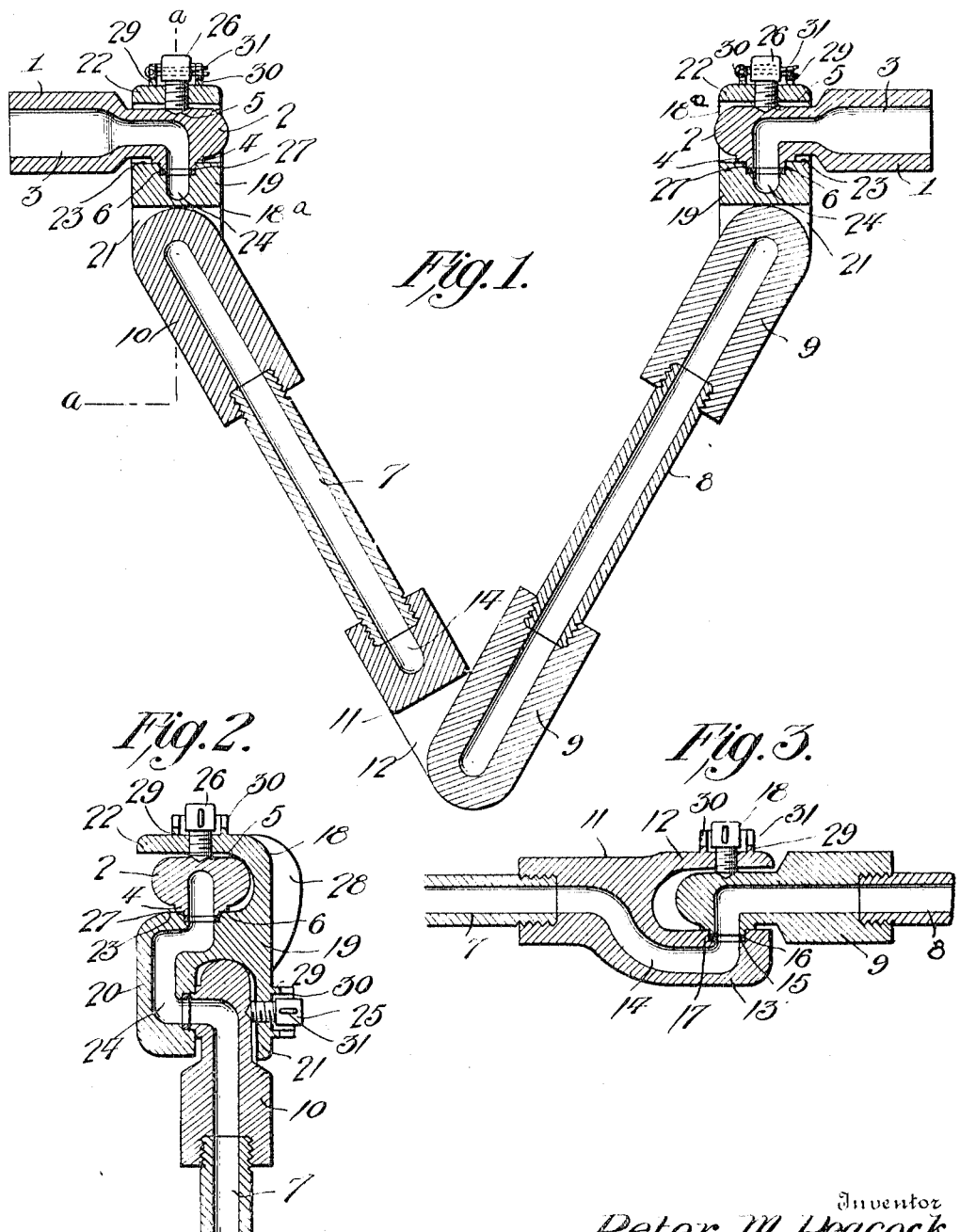
Witnesses
Garroll Bailey
J. W. Garner
Inventor
Peter M. Peacock,
By Victor J. Evans
Attorney

UNITED STATES PATENT OFFICE.

PETER M. PEACOCK, OF COLUMBUS, OHIO.

FLEXIBLE PIPE CONNECTION.

1,105,689. Specification of Letters Patent. Patented Aug. 4, 1914.

Application filed June 8, 1912. Serial No. 702,530.

*To all whom it may concern:*

Be it known that I, PETER M. PEACOCK, a citizen of the United States, residing at Columbus, in the county of Franklin and State of Ohio, have invented new and useful Improvements in Flexible Pipe Connections, of which the following is a specification.

This invention is an improved flexible pipe connection especially adapted for use on railway trains to connect the pipes of steam heating systems or air brake apparatus between the cars or between the locomotive and one of the cars, and to enable the flexible pipe connection to accommodate itself to the motion of the cars or members of the train, the invention consisting in the construction, combination and arrangement of devices, hereinafter described and claimed.

One object of my invention is to effect improvements in the construction of the coupling members whereby the pipes of the connection may be readily connected together or detached at will.

A further object of my invention is to provide improved means for locking the coupling members together.

In the accompanying drawing:—Figure 1 is a sectional view of a flexible pipe connection constructed in accordance with my invention. Fig. 2 is a vertical transverse sectional view on the plane indicated by the line *a—a* of Fig. 1. Fig. 3 is a horizontal sectional view of the coupling between the members 7—8, showing said members arranged in the same plane.

In accordance with my invention, the train pipes are provided at the ends of the cars with coupling members 1 each of which is provided with an extension 2 which is flattened on opposite sides, the said coupling having a bore or passage 3 extending therethrough and which terminates at one side of the projection in a tubular stud 4. In the opposite side of the projection is a recess 5 which is concentric with the said tubular stud. The said tubular stud is provided with a shoulder 6 which extends annularly around the same so that the outer end of the tubular stud is reduced diametrically.

My improved flexible pipe connection comprises a pair of pipe members 7—8. The member 8 is provided at both ends with coupling members 9 which are identical in construction with the members 1. The member 7 has a similar coupling member 10 at one end and is provided at the opposite end, which is adapted to be detachably coupled to the pipe 8 with a coupling member 11 which is formed with a pair of spaced jaws 12—13 to receive the projection of the coupling 9 between them. The said coupling member 11 has a bore or passage 14 which also extends through the jaw 13 and terminates at the inner side of the said jaw in a countersink 15, the said countersink being shouldered as at 16 and adapted to receive the tubular stud of the projection of said coupling member 9. A gasket 17 bears between the projection of the coupling member 9 and the inner side of the jaw 13 which is opposed to the said projection. The recess of the projection of the coupling member which corresponds with the recess 5 hereinbefore described is engaged by the point of a screw stud 18 which operates in a threaded opening in the jaw 12. By tightening this screw stud the gasket may be compressed so as to cause the gasket to coact with the tubular stud and countersink of the connector coupling members to effect a water, steam and compressed airtight joint between the said coupling members as will be readily understood, the said tubular stud, countersink and screw stud coacting to pivotally connect the said coupling members together.

The coupling members 9—10 at the outer ends of the pipe members 8—7 are connected to the coupling members 1 hereinbefore described by angle coupling members 18ᵃ. Each of the said angle coupling members comprises a body 19 formed with a jaw 20, a jaw 21 opposite and spaced from but parallel with the jaw 20 and a jaw 22 which is at right angles to the jaws 20—21 and spaced from a shoulder 23 which forms the inner end of said jaw 20. The jaws 21—22 are solid. The jaw 20 and the intermediate portion of the body are formed with a passage 24 which terminates opposite the jaws 21—22 and in countersinks which are identical in construction with the countersinks hereinbefore described in connection with the coupling member 11 and which countersinks receive the tubular studs of the projections of the coupling members 1—9—10. The jaws 21—22 of the angle coupling members are provided with threaded openings which receive screw studs 25—26 which are identical in construction with the screw stud 18 hereinbefore described and the pointed ends of which engage recesses in the projections of the coupling members 1—9—10, and coact with the tubular studs and with the gaskets indicated at 27 to pivotally connect said coupling members together. It will be observed that the pivotal axes of the coupling members 1—9—10 are at right angles to each other so that universal flexible movement between the pipe members in the train pipes and my improved flexible pipe connection are effected.

The angle coupling members 18ª are provided on their outer sides at the angles between their bodies and the jaws 22 with pairs of longitudinally arranged, spaced reinforcing ribs 28 which greatly strengthen the construction of said angle coupling members. Each of the jawed coupling members is provided on the outer side of the jaw which is provided with the pivot screw stud with an annular flange 29 which has a series of radial notches 30 and each of the screw studs is provided with a sprocket key 31, extending therethrough and which may be engaged with any one of the notches 29 so as to lock the screw stud when the latter is adjusted and thus prevent the casual uncoupling of any of the coupling members.

While I have herein shown and described a preferred form of my invention, I would have it understood that changes may be made in the form, construction and proportion of the several parts without departing from the spirit of my invention and within the scope of the appended claims.

I claim:—

1. The herein described flexible train pipe connection for use between a pair of cars and comprising coupling members for the car ends each having an extension flattened on its upper and also its lower side and also having a bore terminating at the flattened lower side, a pair of pipe members having coupling members at their lower ends pivotally connected together for angular movement in a vertical plane and coupling members at their upper ends each having an extension flattened at opposite sides and provided with a bore terminating at one flattened side; angular coupling members connecting the first-named coupling members and those at the upper ends of the pair of pipe members, each angular coupling member also provided in one side and one end with a recess for the reception respectively of the extensions of the first-named coupling members and those at the upper ends of the pair of pipe members, each recess being at right angles to the other and further provided with a duct connecting said recesses; vertical pivots connecting the angular coupling members to the first-named coupling members for angular movement in a horizontal plane and horizontal pivots connecting the coupling members at the upper ends of the pipe members to the angular coupling members for angular movement in a vertical plane.

2. In a flexible train pipe connection of the class described, an angular coupling member provided in one side and in one end respectively with recesses, open at said side and end and at right angles to each other, and with a duct connecting said recesses and communicating with each recess at one side thereof, in combination with a pair of pipe members each having one end in one of said recesses and having a bore terminating at one side thereof and coincident with one end of the duct in the angular coupling member, and pivots connecting the pipe members to the angular coupling member, each of said pivots being concentric with the adjacent underlying end of the duct of the angular coupling member.

In testimony whereof I affix my signature in presence of two witnesses.

PETER M. PEACOCK.

Witnesses:
   CHAS. C. MONAHAN,
   JOHN F. PADDEN.